Dec. 17, 1946.  G. L. WEBB  2,412,792
CUTOUT RELAY
Filed Nov. 24, 1944  2 Sheets-Sheet 1
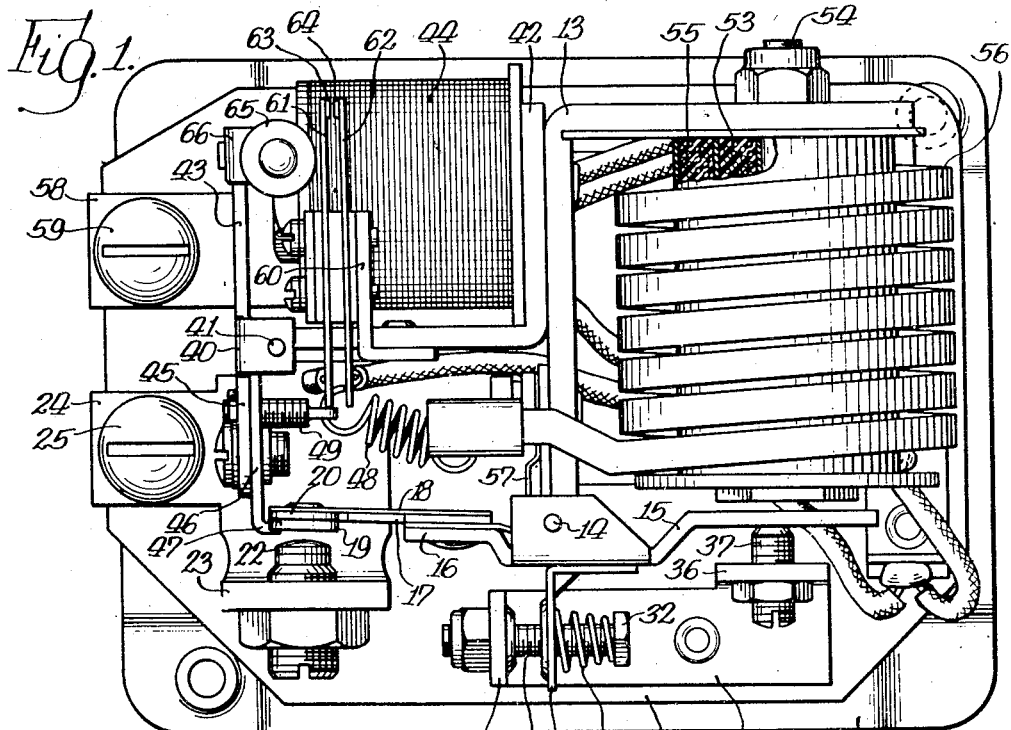
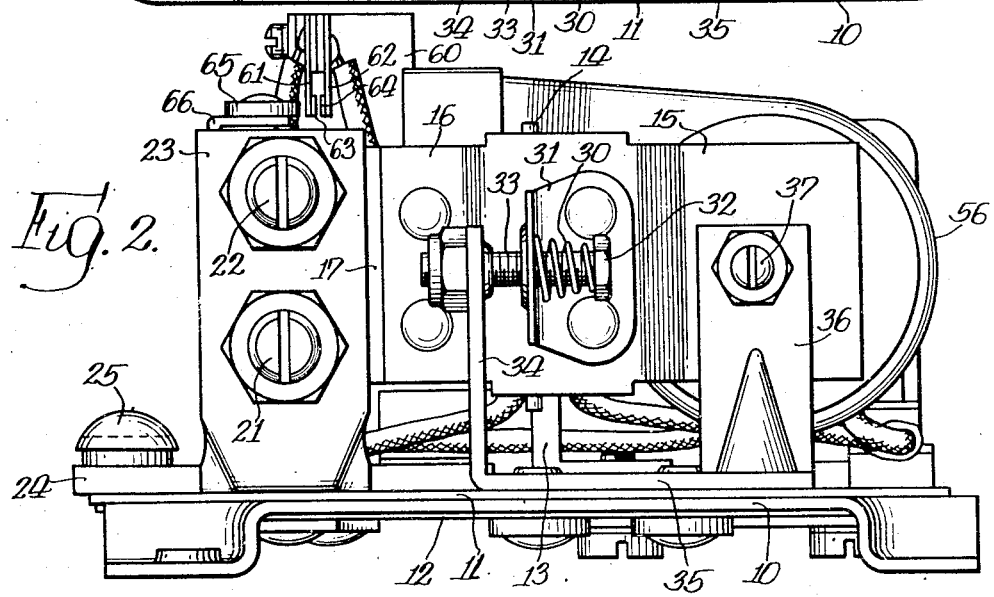
INVENTOR.
George L. Webb,
BY
*Brown Jackson Boettcher Dienner*
Attys.

Dec. 17, 1946.    G. L. WEBB    2,412,792
CUTOUT RELAY
Filed Nov. 24, 1944    2 Sheets-Sheet 2
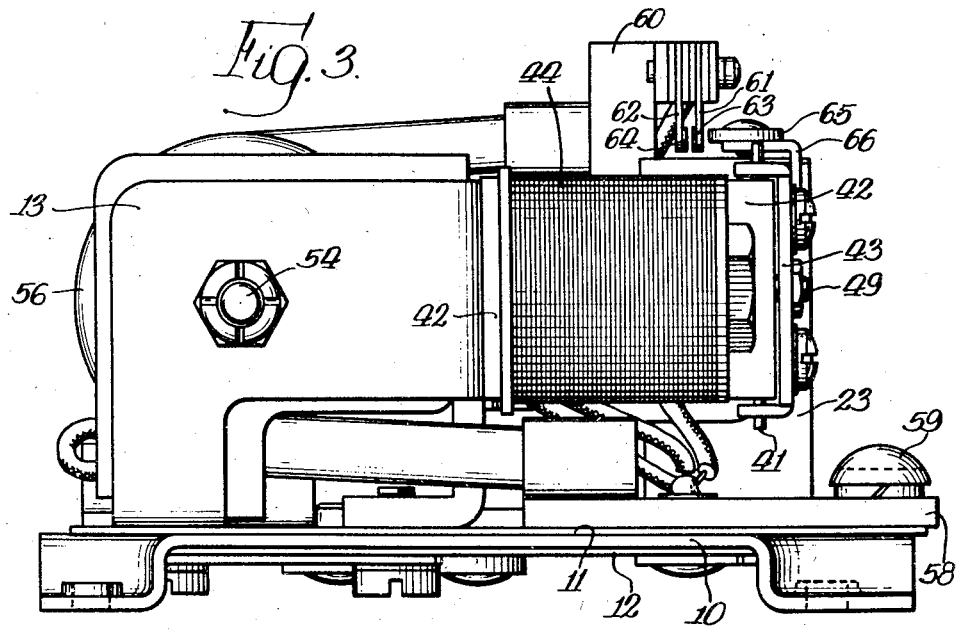
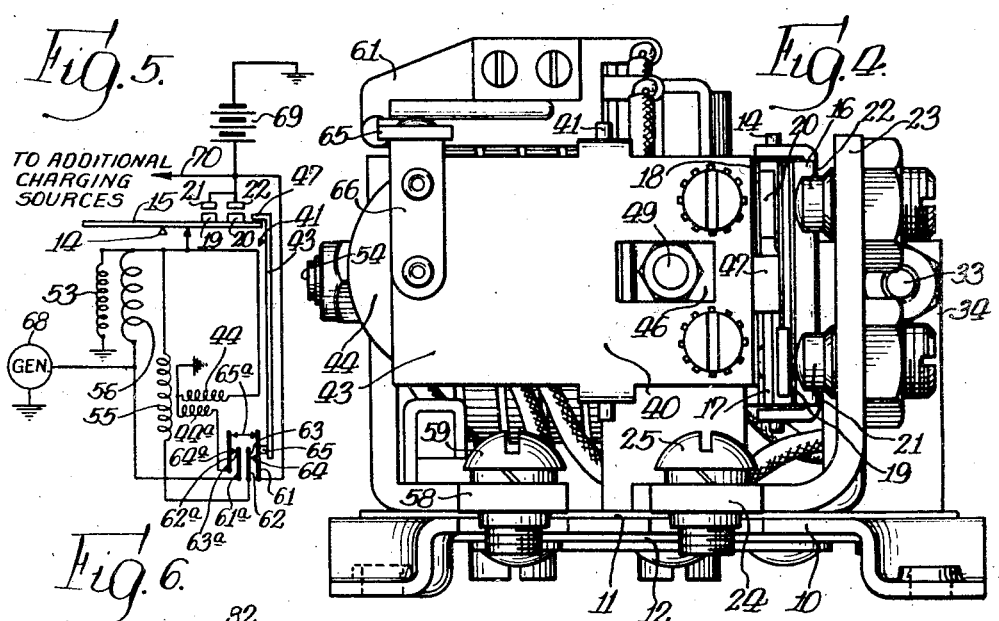
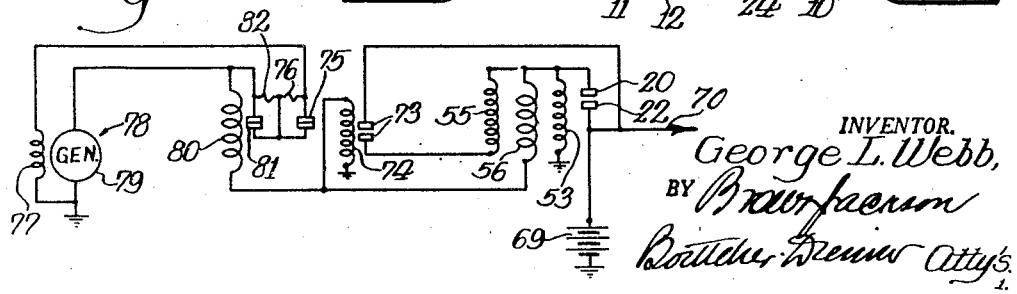
INVENTOR.
George L. Webb, Patented Dec. 17, 1946

2,412,792

UNITED STATES PATENT OFFICE 2,412,792

CUTOUT RELAY

George L. Webb, Logansport, Ind., assignor to R-B-M Manufacturing Company, Logansport, Ind., a corporation of Indiana Application November 24, 1944, Serial No. 564,942

2 Claims. (Cl. 320—33)

This invention relates to cutout relays for battery charging circuits, and is directed to the provision of relays suitable for use with chargers on airplanes and other vehicles subject to severe shocks in use, while also being suitable for use with stationary chargers and in conjunction with more than one variable speed generator for charging a common storage battery.

With a view to causing the main contacts of a cutout or reverse current relay in a battery charging system to close when the generator and battery voltages are about the same, there is provided a differential coil in the relay in addition to the conventional shunt and series coils. The differential coil is arranged to cooperate with the shunt and series coils in controlling the position of the main contacts. It is connected in shunt of the main contacts to be responsive to the difference in potential between the battery and generator voltages and to the direction of said difference to assist the shunt coil in closing the main contacts when the generator voltage is higher than the battery voltage, and to oppose the shunt coil and thereby oppose closing of the main contacts when the battery voltage is the higher.

By arranging to close the main contacts of the relay when the battery and generator voltages are about equal, sparking of the contacts is reduced, particularly where two or more generators are used to charge a common battery. In such case a cutout relay as herein described is used for each generator.

Two generators may be connected in parallel to the battery through regulators and cutout relays employing differential coils. They can be operated over a limited voltage tolerance range without flutter of the circuit breaker points of the low set regulator. The instant the reverse current of the low set regulator exceeds its setting the circuit breaker will open. The differential winding in the circuit breaker then comes into play raising the closing voltage of the circuit breaker above the line voltage so that it cannot reclose until the line voltage becomes lower.

Fluttering and consequent sparking of the main contacts when they open on reverse current flow through the series coil is also reduced through the use of the differential coil. In such case the differential coil opposes the shunt coil since the battery voltage is higher than the generator voltage and permits substantially free action of the biasing means urging the contacts to open position.

A disadvantage of the foregoing arrangement is that the differential coil, being connected between the battery and the generator, provides a path over which the battery discharges through the armature of the generator when the latter is stopped or not generating a voltage opposing the battery voltage. It is to overcoming this disadvantage or difficulty that the present invention is particularly addressed.

An object of this invention is to prevent battery drain through the differential coil of a generator cutout or reverse current relay when the generator is not operating.

Another object of this invention is to control the energization and deenergization of the differential coil in accordance with the generator voltage.

Still another object of this invention is to employ the latch release means of a heavy duty cutout relay for operating auxiliary contacts to control the energiaztion of the differential coil.

An overall object of the present invention is to make practical a system of operating generators in parallel upon a single battery line.

Other objects of this invention will, in part, be obvious and in part appear hereinafter.

For a more complete understanding of the nature and scope of this invention reference can be had to the following detailed description taken in connection with the accompanying drawings in which:

Figure 1 is a top plan view, on an enlarged scale, of a cutout or reverse current relay in which the present invention is incorporated;

Figure 2 is a view in side elevation of the relay shown in Figure 1;

Figure 3 is a view in side elevation of the relay shown in Figure 1 looking toward the side opposite that shown in Figure 2;

Figure 4 is an elevation view of the left hand end of the relay shown in Figure 1;

Figure 5 illustrates, diagrammatically, the circuit connections which may be used in practicing this invention; and Figure 6 illustrates, diagrammatically, an alternative circuit arrangement.

Referring now particularly to Figures 1, 2, 3 and 4 of the drawings, it will be observed that the reference character 10 designates a stamped metal base having suitable downwardly extending integrally formed mounting lugs. Insulating plates 11 and 12 are provided on opposite sides of the base 10 for properly insulating the parts mounted thereon.

On the base 10 and above the insulating plate 11 there is an L-shaped metallic bracket 13 which carries a pin 14 at one end on which an armature 15 is rockably mounted. The armature 15 has an extension 16 which carries a plate 17 of good conducting metal, such as copper, that in turn carries a spring contact finger 18. The plate 17 and finger 18, respectively, carry main contact buttons 19 and 20 for contact engagement with corresponding stationary contacts 21 and 22. It will be understood that the spring contact finger 18 is provided to permit proper seating of the contact buttons 19 and 20 on their respective contacts 21 and 22, both sets being in parallel to provide greater current carrying capacity. The contact buttons 19 and 20 and cooperating stationary contacts 21 and 22 are referred to herein as main contacts and serve to interconnect the battery and generator as will be apparent hereinafter.

The stationary contacts 21 and 22 are carried by the upstanding arm 23 of a bracket the lower portion 24 of which is secured to the base 10 and insulated therefrom by the plate 11. It has a terminal screw 25 for connection to the battery.

A coil compression spring 30 serves to bias the armature 15 and the contact buttons 19 and 20 carried thereby to the open position. It will be noted that the spring 30 is biased between an L-shaped bracket 31 carried by the armature 15 and the head 32 of a bolt 33 which extends through and is secured to the upstanding arm 34 of a bracket the lower portion 35 of which is secured to the base 10 and insulated therefrom by the plate 11. The portion 35 of the bracket has another upstanding arm 36 which carries an adjusting screw 37 that locates the open position of the armature 15.

The cutout or reverse current relay here disclosed is intended for use in airplanes and other vehicles subject to severe shock, as well as in stationary charging systems, as previously stated. It is undesirable that the main contacts be accidentally closed when they should otherwise be open. The spring 30 cannot, from a practical standpoint, be made strong enough to prevent such accidental closing. For the purpose of preventing accidental closing of the main contacts, a latch 40 is rockably mounted on a pin 41 which is carried by an L-shaped bracket 42 secured to the bracket 13, as shown. One end 43 of the latch 40 provides an armature arranged to be attracted by a latch coil 44. The other end 45 of the latch carries a plate 46 which, as will be noted, is secured thereto by suitable screws. The plate 46 has an integrally formed detent 47 that is arranged to extend into the path of the outer end of the plate 17 and prevent the same from being accidentally moved to the closed position. A coil tension spring 48 suitably anchored at one end and attached to an extension 49 from the latch 40 serves to bias it to the latched position. When the latch coil 44 is suitably energized, the biasing force of the spring 48 is overcome and the detent 47 is moved to the unlatched position in which the armature 15 is free to move the contacts 19 and 20 carried thereby into engagement with the contacts 21 and 22 as will be readily understood.

A shunt coil 53, mounted on a core 54 that is carried by the bracket 13, serves initially to effect the closure of the main contacts. As will be indicated hereinafter, the coil 53 is connected for energization across the generator and, when its voltage reaches a predetermined value, the main contacts are closed to permit the generator to charge the battery.

On the same core 54 and surrounding the shunt coil 53 is a differential coil 55 which is connected across the main contacts and, therefore, is energized in accordance with the difference between the battery and generator voltages when the main contacts are open. The arrangement is such that the differential coil assists the shunt coil in attracting the armature 15 when the generator voltage is greater than the battery voltage and opposes it when the generator voltage is less than the battery voltage. In this manner, the lower range of compensation is limited by the closing voltage of the latch relay, and the upper range of compensation is limited by the over voltage capacity of the latch relay coil, which is conducive to efficient operation of the charging system. A wider range of compensation may be desirable in certain cases, and that optionally may be accomplished by the addition of a coil to the latch relay, as will be explained more fully presently.

A series coil 56 surrounds the core 54 as well as the coils 53 and 55 thereon. It is connected by a flexible shunt 57 at one terminal to the plate 17 and to a terminal 58 carrying a terminal screw 59 for connection to the generator. It will be understood that the series coil 56 serves with the differential coil to neutralize the shunt coil 53 and permit the armature 15 to open the main contacts and thus disconnect the generator from the battery.

As indicated hereinbefore, it is desirable to deenergize the differential coil 55 when the generator is stopped. For this purpose there is provided a support 60, Figure 1, on the bracket 42 which carries contact fingers 61 and 62 in insulated spaced relation. These contact fingers 61 and 62 have contact buttons 63 and 64, as shown, which are caused to engage when an insulating washer 65 carried by an arm 66 moves the finger 61 toward the finger 62. The arm 66 is movable with the armature 43 so that, when it is attracted by the latch coil 44, the circuit through the contact buttons 63 and 64 is completed. For purposes herein these contact buttons 63 and 64 and their contact fingers 61 and 62 are called auxiliary contacts. The auxiliary contacts are connected in series with the differential coil 55 so that, when they are open, this coil is deenergized.

The circuit connections for the coils and contacts of the cutout or reverse current relay are shown diagrammatically in Figure 5 of the drawings. It will be noted that the relay is connected between a generator 68 (usually a variable speed generator driven by the engine of the vehicle) and a storage battery 69. The circuit connection to additional charging sources or generators is indicated at 70. It will be understood that for each additional generator there will be a cutout relay of the character described hereinbefore.

In operation the latch coil 44 is arranged to attract its armature 43 and release the latch 40 at a lower voltage of the generator 68 than the shunt coil 53 is arranged to attract its armature 15. This insures that the detent 47 of the latch 40 is moved out of the path of the plate 17 and permits the main contacts to be closed for connecting the generator 68 to charge the battery 69.

At the same time that the latch 40 is moved to unlatched position the auxiliary contacts are closed to complete the energizing circuit for the differential coil 55. This coil then assists or opposes the shunt coil 53 depending upon the relative values of the generator and battery voltages as previously set forth. When the voltage of the generator 68 is reduced, as when it is stopped, the voltage of the battery 69 exceeds that of the generator 68. The current flow through the series coil 56 is reversed and it neutralizes the shunt coil 53, the energization of which is reduced as a result of reduced generator voltage. The spring 30 then actuates the main contacts to open position at which time current flows through the differential coil 55 and it further neutralizes the shunt coil 53. The latch coil 44 is arranged to release its armature 43 at a voltage lower than the voltage at which shunt coil 53 releases its armature 15 so that the latter is permitted to move to full open position before the detent 47 is moved into the path of the plate 17. At that time the auxiliary contacts are opened so that the differential coil 55 is deenergized, thereby preventing drain of the battery 69 through the generator 68 if this circuit were not opened.

Referring further to the diagram of Figure 5, the shunt coil 53 may be connected to either end of the series coil 56, as may the differential coil 55, as will be understood. I have also shown in Figure 5 an additional coil 44a, above referred to, for the latch relay. The circuit of coil 44a is controlled by contact fingers 61a and 62a and associated contact buttons 63a and 64a, respectively, carried thereby. The finger 62a has mechanical connection 65a to contact finger 61 such that when the latter finger is moved to circuit closing position finger 62a is moved to circuit opening position and vice versa. The arrangement is such that when coil 44a is energized it attracts armature 43, thereby opening the circuit of coil 44a, armature 43 being then held attracted by coil 44 until released therefrom as above described. That provides for a greater range of compensation than is attainable without the additional coil 44a for the latch relay. Since the circuit of coil 44a is open when the main contacts are closed, there is no risk of the battery 69 draining through the generator 68. The additional coil 44a for the latch relay is optional and may be used or not as desired, as will be understood from the foregoing.

In Figure 6 of the drawings there is shown a modification of the battery charging circuit shown in Figure 5. It will be noted that the same shunt coil 53, differential coil 55 and series coil 56 are used for controlling the operation of the main contacts, a pair of which is shown at 20 and 22. If desired a latch coil and a latch operated thereby can be used for the purpose described hereinbefore.

In this embodiment of the invention, however, contacts 73 are provided for controlling the energization of the differential coil 55. The contacts 73 may be operated by a voltage regulating relay whose coil 74 is shunted across the charging generator. The coil 74 also controls contacts 75 arranged to shunt a resistor 76 connected in the circuit of the field coil 77 of the generator, shown generally at 78. The armature 79 of the generator 78 is connected through the coil 80 of a current regulating relay whose contacts 81 are arranged to shunt resistor 82 also connected in the circuit to the field coil 77. The arrangement is such that the contacts 73 will close at a predetermined voltage below that at which the contacts 75 open, but will not open at the reduced voltage caused by operation of the regulating relay contacts 81.

It will be apparent that the energization of the differential coil 55 will be controlled in the system shown in Figure 6, as it is in the system shown in Figure 5, in accordance with the charging generator voltage, the object in either system being to prevent drain of the battery 69 through the differential coil 55 when either the generator 68 or 78 is stopped or not operating. The battery 69 of Figure 6 may be arranged for charging by two or more generators with duplicate regulators and cutouts as specifically described above. Such a multiple system has very definite advantages over known circuits. The generator circuit breaker will close closer to line voltage on low line voltages. This is due to the action of the differential circuit breaker winding which aids the circuit breaker voltage winding causing the circuit breaker to close below its open circuit setting. The generator will always come on the line even though the circuit breaker open circuit setting is above the voltage regulator setting. This is again due to the action of the differential winding. No extra regulator terminals, contacts and external wiring are needed to obtain practical parallel operation. The regulator with the additional windings described above is interchangeable with present production regulators.

Since the differential coils are automatically deenergized upon dropping of the generator voltage, no drain through the battery occurs when the corresponding generator is not running. Usually one generator regulator will be set for a higher voltage than another. But even under those conditions the operation is without flutter and without battery drainage when each generator with its regulator and cutout is arranged as per Figure 6.

Since certain further changes can be made in the foregoing construction and different embodiments of the invention can be made without departing from the spirit and scope thereof, it is intended that all matter shown in the accompanying drawings or described hereinbefore shall be interpreted as illustrative and not in a limiting sense.

What is claimed as new is:

1. For combination with a battery and a variable speed generator for charging the same, a cutout relay comprising main contacts for connecting the battery to the generator, a shunt coil disposed to be connected for energization across the generator and to close said main contacts when the generator voltage reaches a predetermined value, a series coil disposed to be connected in series circuit relation with the generator to assist said shunt coil in holding said main contacts closed when current flows from the generator to the battery, a differential coil disposed to be connected to be responsive to the difference between the battery and generator voltages and to assist said shunt coil in closing said main contacts when the battery voltage is less than the generator voltage, a latch finger cooperating with said main contacts and biased to normally hold the same in open position, a latch release coil disposed to be connected for energization to the generator and to operate said latch finger to release position when the generator voltage reaches a predetermined value, and normally open auxiliary contacts disposed to be closed by said latch finger on operation thereof to release position, said auxiliary contacts being connected in series circuit relation with said differential coil for effecting its energization when said latch finger is operated to said release position.

2. A heavy duty cutout for battery charging circuits for motor vehicles such as trucks, tanks and the like subject to shock comprising, in combination, main contacts for opening and closing the charging circuit between the battery and the generator, a shunt coil disposed to be energized by the generator for closing said contacts, a series coil for opposing said shunt coil when current flows from the battery to the generator, a differential coil disposed to be energized in accordance with the difference between the battery and generator voltages for assisting said shunt coil in closing said main contacts when the battery voltage is less than the generator voltage, auxiliary contacts connected in series with said differential coil, a latch normally preventing said main contacts from accidentally closing due to shock incident to operation of the vehicle, a latch coil disposed to be energized by the generator for operating said latch to release position at predetermined generator voltage, and means carried by said latch for closing said auxiliary contacts when the latch is released.

GEORGE L. WEBB.